United States Patent [19]
Deshayes

[11] Patent Number: 5,204,733
[45] Date of Patent: Apr. 20, 1993

[54] APPARATUS FOR CALIBRATING AN OPTICAL INSTRUMENT, AND APPLICATIONS THEREOF

[75] Inventor: Jean-Pierre Deshayes, Montgiscard, France

[73] Assignee: Centre National d'Etudes Spatiales, France

[21] Appl. No.: 631,599

[22] Filed: Dec. 20, 1990

[30] Foreign Application Priority Data
Dec. 22, 1989 [FR] France ................. 89 17100

[51] Int. Cl.$^5$ .................. G01M 11/02; B64G 1/66
[52] U.S. Cl. ........................... 356/243; 250/252.1
[58] Field of Search ............. 356/243; 250/252.1 A

[56] References Cited
U.S. PATENT DOCUMENTS

| | | | |
|---|---|---|---|
| 3,994,601 | 11/1976 | Brugger | 356/243 |
| 4,167,328 | 9/1979 | Cross et al. | 356/243 |
| 4,681,444 | 7/1987 | Ferber et al. | 356/318 |

Primary Examiner—Richard A. Rosenberger
Attorney, Agent, or Firm—Skjerven, Morrill, MacPherson, Franklin & Friel

[57] ABSTRACT

To calibrate a radiometric optical instrument by means of a light source, the focal plane of the optical instrument containing photoelectric detectors which convert image brightness into an electrical signal, the light source is disposed in the entrance pupil or in the aperture diaphragm of the instrument. The invention is particularly suitable for calibrating an optical instrument on board a satellite.

7 Claims, 1 Drawing Sheet

APPARATUS FOR CALIBRATING AN OPTICAL INSTRUMENT, AND APPLICATIONS THEREOF

The invention relates to calibrating a radiometric optical instrument by means of a light source, the focal plane of the instrument containing photoelectric detectors such as charge transfer detectors which convert image brightness into an electrical signal, and the invention is particularly applicable to in-flight calibration of an instrument on board a satellite.

The invention applies in particular to calibrating the aiming optics of a device for observing the Earth.

BACKGROUND OF THE INVENTION

The object of the invention is to provide a photometric calibration device, i.e. enabling photometric magnitudes to be measured, which device should be lightweight enough and compact enough to be capable of being embarked on board a satellite and should be capable of remaining permanently in place without impeding the normal operation of the optical instrument.

The invention is equally applicable to optical instruments including a real entrance pupil and to optical instruments including a virtual entrance pupil.

SUMMARY OF THE INVENTION

In the first case, according to the invention, the optical instrument is calibrated by means of a light source disposed in the inlet pupil.

In the second case, according to the invention, the optical instrument is calibrated by means of a light source placed in the aperture diaphragm of the instrument.

The light source is selected to be small enough for the occultation constituted thereby while taking pictures to be considered as being negligible.

For example, the source may be constituted by a light emitting diode or by the end of an optical fiber transmitting light to the center of the entrance pupil or of the aperture diaphragm, with the light coming from a remotely located calibration source, which source may be constituted by the sun, for example.

BRIEF DESCRIPTION OF THE DRAWING

An embodiment of the invention is described by way of example with reference to the accompanying drawing, in which.

DETAILED DESCRIPTION

Figure 1:
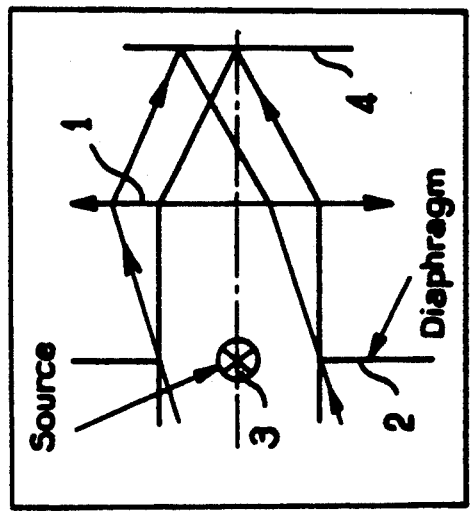
FIG. 1 is a diagram showing the principle of apparatus of the present invention.

In FIG. 1, an objective lens is shown diagrammatically at 1, and a light source 3 is placed at the center of the diaphragm 2 of said objective lens, with the position of the light source 3 ensuring that it gives rise to uniform illumination of the focal plane 4 of the lens 1.

Figure 2:
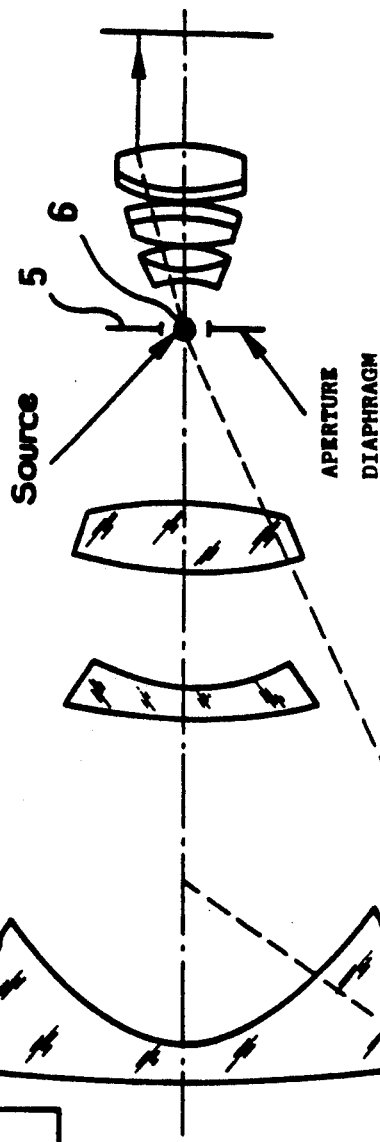
FIG. 2 is a diagram of one application of the apparatus.

FIG. 2 shows the various different lenses of a complex aiming objective lens system together with its aperture diaphragm 5, with a small light source 6 placed at the center of the aperture diaphragm in accordance with the invention, which light source may be constituted, for example, by the end of an optical fiber mounted in fixed manner to the satellite.

This objective lens may be constituted by the telecentric lens of a camera on board a satellite for observing vegetation.

The invention makes it possible to ensure that signals from the objective lens are indeed representative of input magnitudes.

The invention is not limited to the embodiment described above.

I claim:

1. Apparatus for calibrating a radiometric optical instrument of the kind including a focal plane, an entrance pupil and an aperture diaphragm, by means of a light source, said focal plane of the optical instrument containing photoelectric detectors which convert image brightness into an electrical signal, wherein said light source is disposed in the entrance pupil or in the aperture diaphragm of the instrument.

2. Apparatus according to claim 1, wherein said light source is disposed in the center of the entrance pupil or of the aperture diaphragm.

3. Apparatus according to claim 1, wherein said light source comprises a light

4. Apparatus according to claim 1, wherein said light source comprises one end of an optical fiber which transmits light from a remotely located calibration source.

5. An apparatus according to claim 4, wherein the sun is used as the remotely located calibration source.

6. An apparatus according to claims 1 or 5, wherein said apparatus and said instrument are on board a satellite.

7. An apparatus according to claim 6, wherein said instrument is a camera for observing the Earth.

* * * * *